April 7, 1964 K. J. BRAUN 3,128,372

RECORD ANALYZING APPARATUS

Filed July 27, 1960 7 Sheets-Sheet 1

Inventor
Karl J. Braun

April 7, 1964 K. J. BRAUN 3,128,372

RECORD ANALYZING APPARATUS

Filed July 27, 1960 7 Sheets-Sheet 2

April 7, 1964 K. J. BRAUN 3,128,372

RECORD ANALYZING APPARATUS

Filed July 27, 1960 7 Sheets-Sheet 5

April 7, 1964 K. J. BRAUN 3,128,372

RECORD ANALYZING APPARATUS

Filed July 27, 1960 7 Sheets-Sheet 6

April 7, 1964 K. J. BRAUN 3,128,372

RECORD ANALYZING APPARATUS

Filed July 27, 1960 7 Sheets-Sheet 7

United States Patent Office 3,128,372

Patented Apr. 7, 1964

3,128,372

RECORD ANALYZING APPARATUS

Karl J. Braun, Springdale, Conn., assignor to A. Kimball Company, Brooklyn, N.Y., a corporation of New York Filed July 27, 1960, Ser. No. 45,661
10 Claims. (Cl. 235—61.11)

This invention relates to apparatus for analyzing records having data encoded thereon. More particularly the invention relates to improvements in apparatus for analyzing data coded on records according to more than one code and for controlling the operation of data processing devices according to the value of such data. By way of illustration and not to limit the broader aspects of the invention, such devices may include card reproducers, tabulators, printers and other devices utilized in the data processing field.

There is disclosed in United States Patent No. 2,857,001 issued in my name a record controlled reproducing machine having mechanisms substantially similar to those utilized in the present apparatus for feeding and sensing perforated records in the form of tags. As therein disclosed, the tags being handled are coded according to a well-known modified binary code having four index positions in each column of perforations in which objects are coded by perforations in one or two of the four index positions. By utilizing a fifth or checking index position in each column each digit is always coded by the presence of two perforations in each column. Such record tags are usually perforated according to either one or the other of the above codes when the tag is initially prepared in the machine of the type illustrated in United States Patent No. Re. 24,547 also issued in my name. Accordingly, machines for analyzing such record tags are adapted to decode the perforations sensed according to one code or the other without intermixing of the codes on the same record tag.

Auxiliary machines have been provided which are capable of perforating additional information on the tag subsequently to its initial preparation. Thus, where it is desired to add information to the tag it is possible for individual tags to be perforated according to two different codes. In order to process such tags with the presently known analyzing apparatus it is necessary to analyze each record tag twice, once for each code.

Accordingly, it is an object of this invention to provide an analyzing apparatus which is capable of decoding individual perforated records according to two codes during one pass through the machine. To this end and in accordance with a feature of this invention, each column of perforations on the record is decoded by a mechanism individual to the column, which mechanism is settable at the will of an operator to decode the perforations sensed alternately according to either of the above codes. Thus, at the will of an operator the analyzing apparatus is settable to analyze records having either of the above two codes or to analyze records having both codes intermixed on the same record.

According to another feature of the invention improvements are provided for selecting at the will of the operator any column of the record for field switching in controlling a secondary device. This sort of selective operation allows far greater versatility in the control of secondary devices over that offered by apparatus heretofore available. According to a further feature each column of information may be selectively controlled for determining errors in the decoding device.

The above and other features of the invention together with various novel details of construction will now be described with particular reference to the drawings and thereafter distinctly pointed out in the claims.

Figure 4:
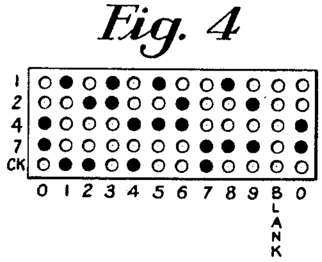
FIG. 4 is a diagram illustrating the code utilized in fields A, B and C of the tag shown in FIG. 3.
Figure 5:
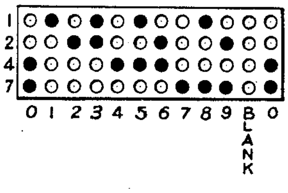
FIG. 5 is a diagram illustrating the code used in field D of the tag of FIG. 3.

The invention will now be described by way of example in its application to the analyzing of perforated data sensed from the type of record tag T illustrated in FIG. 3. As therein illustrated the tag is provided with a plurality of punched information index point positions arranged in columns. As illustrated, the columns are further arranged in four fields A, B, C and D. The fields A, B and C are perforated according to a five element modified binary code having the bit or positional values of 1, 2, 4, 7 and check. This code together with the corresponding digital values is illustrated in FIG. 4. For purposes of illustration of one phase of the invention the field D of the tag is perforated according to a four-element modified binary code having the bit or positional values of 1, 2, 4 and 7. This code with the corresponding digital values is illustrated in FIG. 5.

Figure 2:
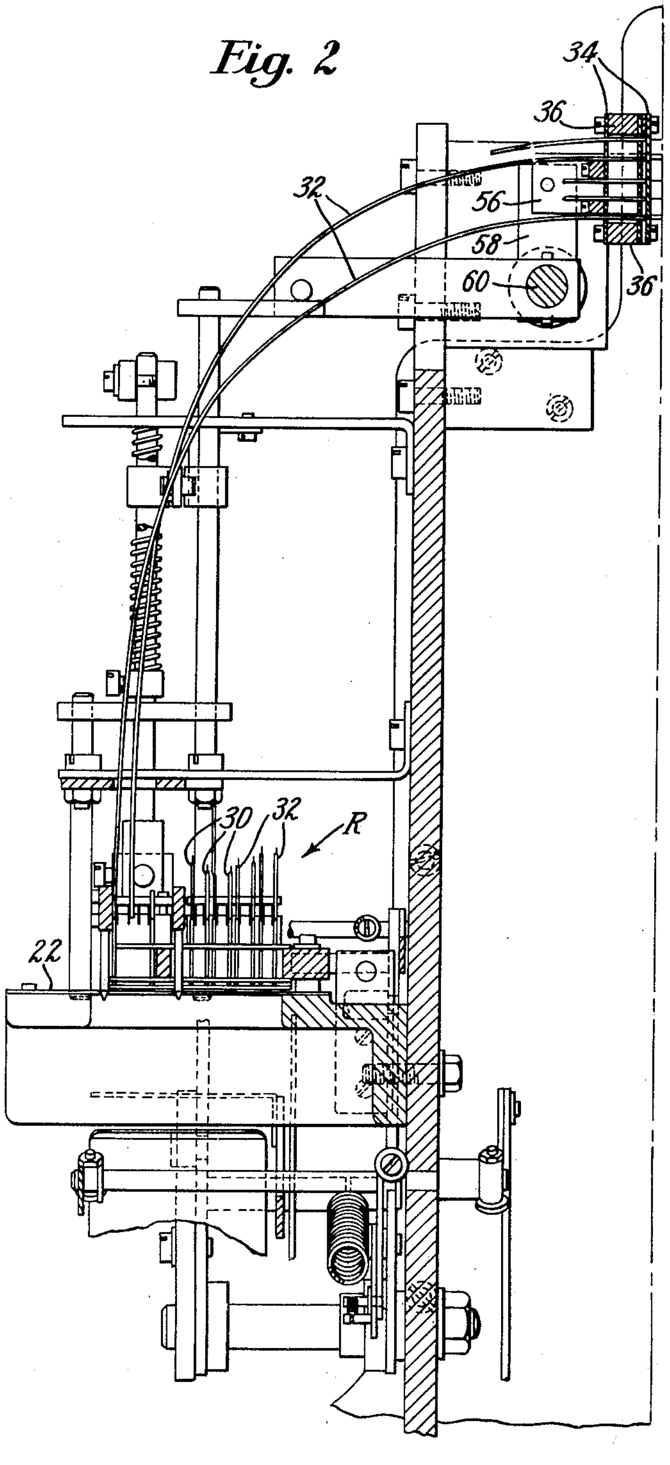
FIG. 2 is a side elevation in enlarged scale of the record sensing mechanism.
Figure 6:
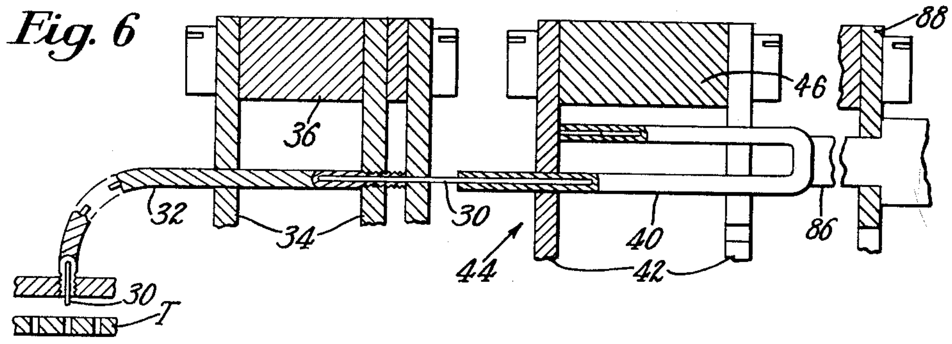
FIG. 6 is a fragmentary sectional view in side elevation of a portion of the tag sensing mechanism.
Figure 7:
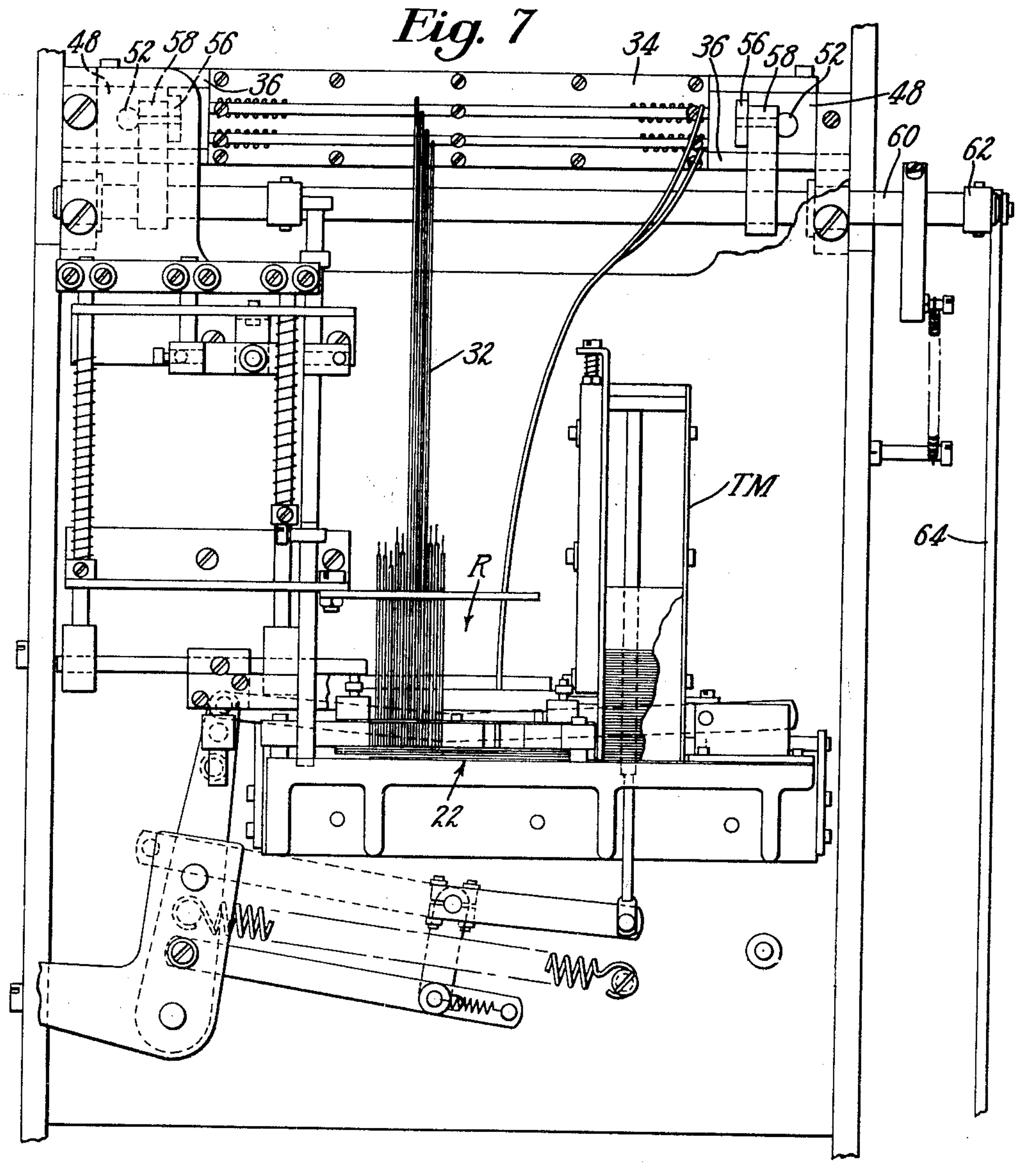
FIG. 7 is a front elevation of the tag sensing mechanism shown in FIG. 2.

The tag reader for feeding and sensing the tags to be analyzed is illustrated in FIGS. 2, 6 and 7. The tag feeding and sensing mechanisms utilized are generally similar to those illustrated in the above mentioned United States Patent No. 2,857,001 which makes reference to United States Patent No. 2,704,186 also issued in my name and which particularly describes the tag feeding and sensing mechanism which is treated here only briefly. It should be obvious that other means for sensing and feeding could be utilized without affecting the scope of the present invention.

As illustrated, perforated tags T are fed one at a time from a magazine TM along a table 22 to a read station R and thereafter to a receiver. At the read station the code perforations on each tag are sensed and the sensed information is decoded into corresponding digital values in a manner to be described. For sensing the presence of code holes in the columns of the tag at the read station a sensing wire 30 (FIG. 6) is provided for each possible code index position on the tag. Each wire operates within a tubular casing 32 which is secured at its lower end at the read station R in a manner disclosed in the above-mentioned patents. The upper end of each casing 32 is received in spaced holes provided in two parallel plates 34 fixed to two cross bars 36 which are secured to the side frames of the machine.

Figure 1:
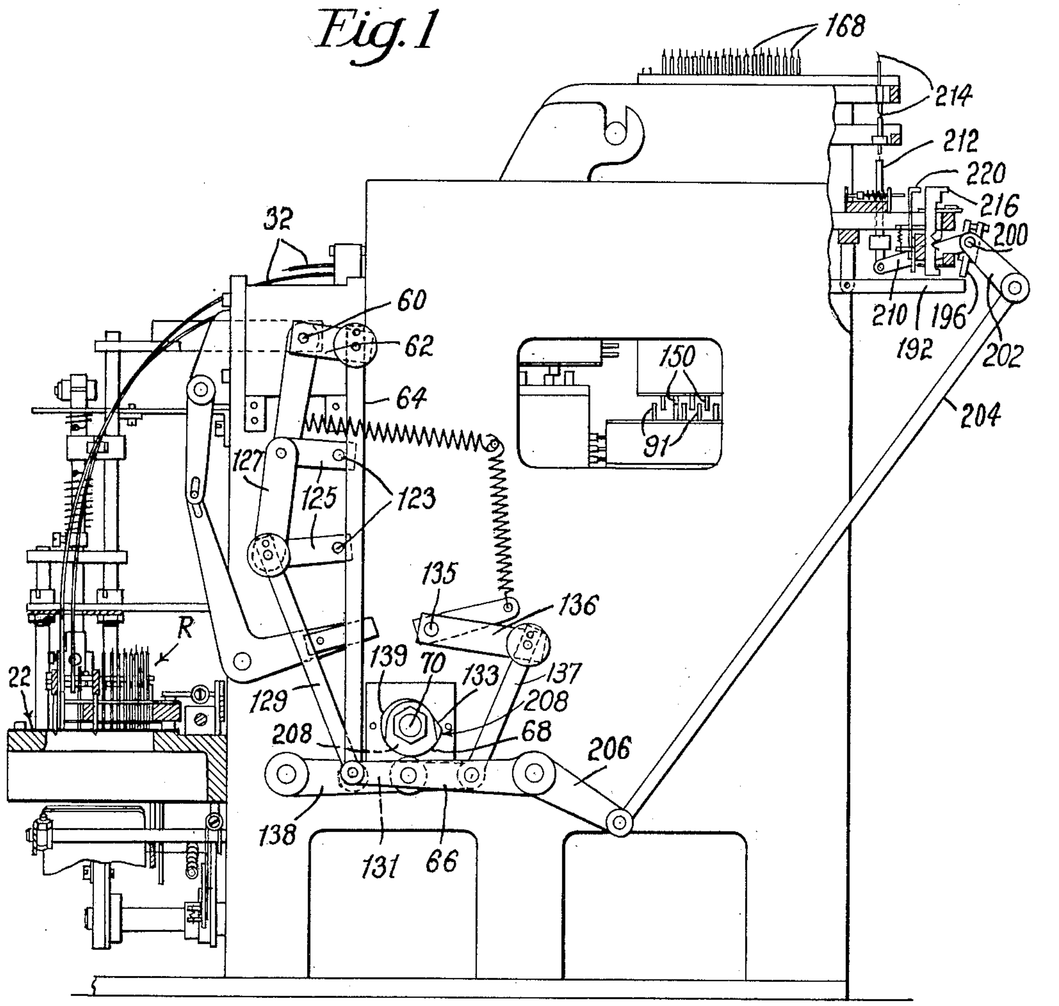
FIG. 1 is a side elevation of a record analyzing machine embodying the present invention.
Figure 8:
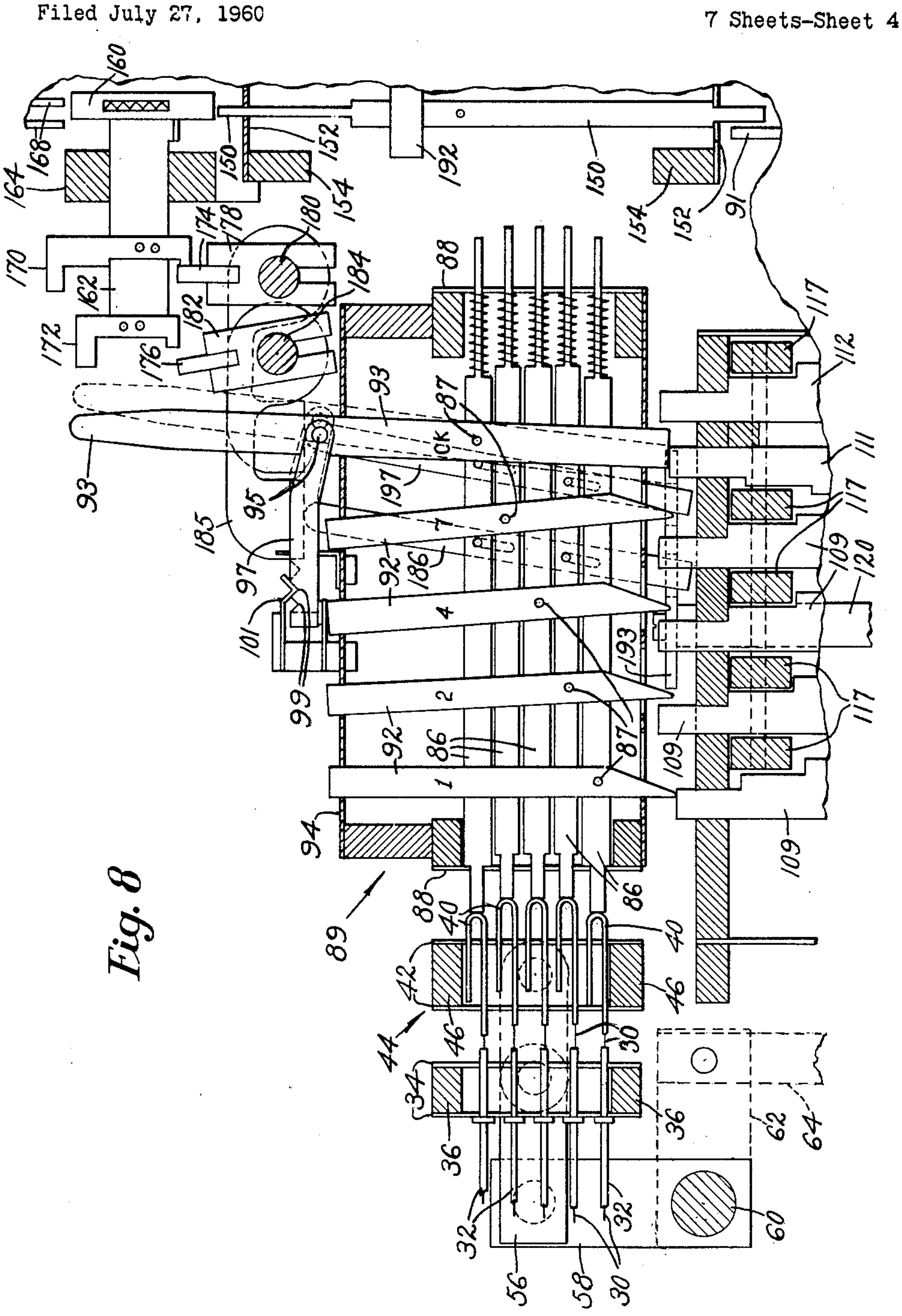
FIG. 8 is a side elevation with parts broken away to illustrate a portion of the decoding mechanism.
Figure 9:
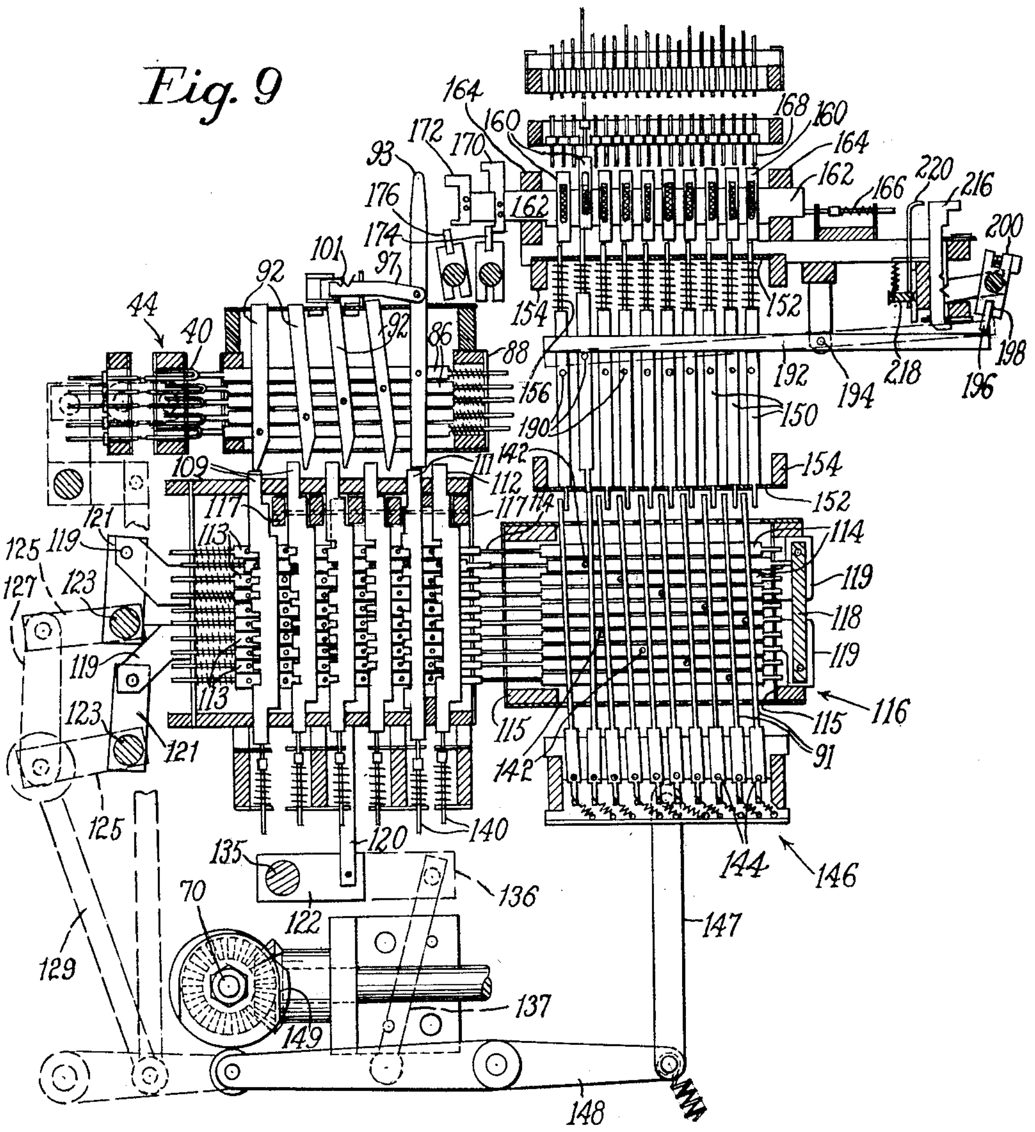
FIG. 9 is a sectional side elevation of a complete mechanism for decoding one column of perforations on the record tag.

The five sensing wires 30 and casings 32 for an individual tag column are arranged in a vertical row as seen in FIGS. 8 and 9 so that the mechanisms illustrated in these figures are associated with a single tag column, there being a similar mechanism provided for each tag column so that a description for one applies to all columns. The upper end of each sensing wire 30 extending from its tube is fixed to a U-shaped tube 40 (FIG. 8) which is slidably mounted within a pair of plates 42 forming part of an oscillating unit 44 which receives the tubes 40 for all columns. The plates 42 are secured to a pair of cross bars 46 fixed at opposite ends to a pair of slide blocks 48 (FIG. 7) which are arranged to reciprocate along rods 52. The blocks 48 are connected by links 56 (see also FIG. 2) to the upper ends of a pair of arms 58 fixed to a shaft 60. At one end the shaft has fixed thereto an arm 62 (FIG. 1) which in turn is connected by a link 64 to a cam lever 66 cooperating with a cam 68, fixed to a cam shaft 70. During the sensing cycle of the machine the link 64 is moved upwardly rocking the shaft 60 in a counterclockwise direction causing the oscillating unit 44 to be moved to the left as seen in FIG. 8.

Each of the U-shaped tubes is engaged by one end of an individually spring pressed sensing pin 86 mounted for horizontal sliding movement in two perforated plates 88 which are secured to a fixed frame 89. Thus, it should be apparent that as the oscillating unit 44 is moved to the left, the spring pressed pins 86 acting on the U-shaped tubes urge each sensing wire individually to the left and downwardly into engagement with a tag T at the read station. Each sensing wire entering a perforation in the tag is moved to a forward position while the wires encountering solid portions of the tag are stopped. As illustrated in FIG. 8, the relative positions of the sensing pins 86 indicate that the uppermost and lowermost sensing wires 30 have entered perforations in the tag while the other three sensing wires have not. In this manner the pins 86 are set in sensed or non-sensed positions in accordance with the column of perforations in the tag related to the pins.

Four of the spring pressed pins 86 are pivotally connected by extrusions 87 thereon to individual latches 92 fulcrumed at their upper ends in a plate 94 secured to the upper side of the fixed frame 89. One of the pins 86, however, is connected by its extrusion 87 to an adjustable latch 93 which is fulcrumed at 95 to an adjustable link 97. This link is provided with two notches 99 which are engaged by a spring detent plate 101 to determine the setting of the link in one of two possible positions so that the fulcrum of the adjustable latch 93 is settable alternately in one of two positions. As illustrated in FIG. 8, the adjustable latch 93 is in the position adapted to decode the perforations sensed from the tag according to the check or 5 bit code as will be seen from the following description. For convenience the latches 92 have been numbered 1, 2, 4, 7 respectively, while the latch 93 has been labeled CK so that it is possible to associate the various latches and their associated sensing wires with the code values of the corresponding index positions in the tag. As illustrated, the sensing wire for the check bit position has sensed a hole in the tag so that the latch 93 has been moved to its forwardmost position. In this position the latch 93 is alined with and blocks vertical movement of a decoding slide 111. However, if no hole were sensed in the check bit index position the latch 93 would be held in its rearward position so that the lower end of the latch would be alined with a decoding slide 112. The latches 92 are arranged to control the vertical movement of four decoding slides 109 as will presently appear.

As illustrated, the latch 92 for the one bit position is alined with its associated slide 109 while the latches 92 for the 2, 4 and 7 positions have not been alined with their associated decoding slides 109. Through the various position combinations or setups in the punching of the tags it will be understood that the decoding slides 109, 111 and 112 in the latched or unlatched positions will control the horizontal movement of ten setup pins 113 (FIG. 9) to effect various combinations in the five bit code representative of the digits 0–9. Thus, the latch 92 for the one bit position and the latch 93 for the check bit position are alined over their respective decoding slides 109 and 111 so that the setup pin 113 representative of the digit 1 is alined with notches in all of the slides 109, 111 and 112 permitting its movement to the right, while all other pins 113 representing other digits are blocked against movement.

Figure 3:
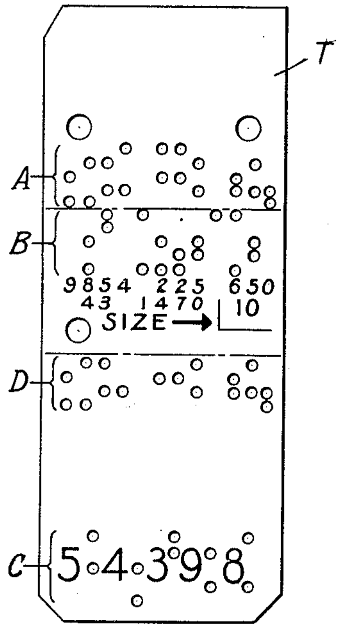
FIG. 3 illustrates a typical record in the form of a perforated merchandise tag to be analyzed.

As previously discussed, some of the tag columns have data recorded in the four bit code as illustrated in FIGS. 3 and 5. Accordingly, in order to decode those columns it is necessary to condition the decoding mechanism to operate regardless of the absence of the fifth or check bit index position. This is accomplished by the operator merely by moving the latches 93 associated with each four bit tag column to the right to the dashed line position as seen in FIG. 8 so that the spring detent 101 enters the forward notch 99 in the link 97. This causes the fulcrum 95 of the latch to be moved to a different position. Since according to the four bit code there is never a perforation for the check bit wire 30 to sense, the corresponding sensing pin 86 and latch 93 will always occupy the non-sensed position. The disposition of the pin 86 and fulcrum 95 under these conditions causes the lower end of the latch 93 to engage both decoding slides 111 and 112 preventing their upward movement. With both slides held down during the decoding cycle, the notches therein are alined with all the setup pins 113 rendering the slides 111, 112 ineffective to control the decoding operation. Thus, the latches 92 and decoding slides 109 assume complete control of decoding without interference from the check bit latch and decoding slides. From the foregoing discussion it should be apparent that the apparatus can be easily set by the operator to decode tags perforated entirely in either the four or five bit code or to decode tags perforated according to both codes intermixed on the same tag.

Each of the setup pins 113 is urged to the right by an individual spring associated therewith and at one end engages an associated translating pin 114. The pins 114 are mounted for movement in two perforated vertical plates 115 secured to a frame 116 fixed to the side frames. At their right ends, as seen in FIG. 9, the pins 114 are engaged by a vertical restoring plate 118 which is mounted for horizontal back and forth movements in the frame 116. At each side the plate 118 is connected by two links 119 to upright arms 121 fixed to a pair of shafts 123 mounted in the side frames. At one end, the shafts have fixed thereto arms 125 (FIG. 1) connected together by a link 127 for unitary movement. The lowermost arm 125 also is connected by a link 129 to a cam lever 131 coacting with a cam 133 on the shaft 70 for providing the back and forth movements of the plate 118 for resetting the pins 113, 114.

During the sensing cycle of the machine the plate 118 is moved to the left by the cam 133 restoring the pins 113, 114 to their initial positions against the action of their individual springs. At the same time the decoding slides 109, 111, 112 are held in their lowermost positions below the ends of their associated latches 92, 93 by a series of cross bars 117 (FIGS. 8 and 9) which are spaced in parallel relation to one another so that each bar engages all the corresponding decoding slides for successive decoding mechanisms across the width of the machine. The bars 117 at opposite ends are united by bolts and spacers to form a rigid frame which at opposite sides is connected by depending links 120 to a pair of arms 122 fixed to a shaft 135. The shaft 135 has fixed thereto an arm 136 connected by a link 137 to a cam lever 138 cooperating with a cam 139 to move the bars 117 up and down. Shortly after the tag has been sensed and the latches 92, 93 have been set the bars 117 are raised through the action of the cam 139 releasing the decoding slides 109, 111 and 112 for upward movement caused by individual spring-pressed pins 140 as is apparent from FIG. 9. Certain of the decoding slides will be latched against heightwise movement by their associated latches 92, 93 while other decoding slides are allowed to rise to their uppermost positions as illustrated, unblocked by any of the latches. Shortly after the decoding slides have risen the plate 118 is moved to the right releasing the translating pins 113 for movement to the right caused by their individual springs so that any pin which is not blocked by the decoding slides will move to the right also moving its associated pin 114.

Each of the pins 114 is provided with an extrusion 142 which engages an associated tumbler pin 91. Accordingly, the single pin 114 moving to the right also causes a tumbler pin 91 to be swung to the right about its individual fulcrum 144 and against the action of an individual spring. The fulcrums 144 for the tumbler pins are mounted in a frame 146 which is moved up and down through links 147 connected to cam levers 148 pivotally mounted on the insides of the machine frame, the movement of the levers 148 being controlled by cams 149 on the cam shaft 70. During movement of the pins 113, 114 the frame 146 is held in its lowermost position so that the upper ends of the tumbler pins underlie the lower ends of individually associated intermediate pins 150. The intermediate pins are mounted for vertical movements between a pair of plates 152 secured to cross bars 154 fixed to the side frames of the machine. Each of the intermediate pins 150 is urged downwardly by an individual spring 156. After movement of the plate 118 to the right so that one tumbler pin has also been moved to the right as illustrated in FIG. 9, the frame 146 is raised by the cams 149 causing the tumbler pin 91, which has been moved, to raise an associated intermediate pin 150.

Each of the intermediate pins 150 has associated therewith a slide 160 mounted for vertical movements on a cross slide 162 there being an individual cross slide for each decoding mechanism. The slides 162 are carried for horizontal movements in a pair of fixed bars 164 with each slide 162 being urged to the left by an individual spring 166. Each slide 162 and the slides 160 which it carries are movable between two positions so that each of the slides 160 may be aligned with one or the other of a pair of flexible control wires 168, while remaining in engagement with its associated pin 150 (see also FIGS. 10 and 11). The control wires are each adapted to control the operation of an individual unit (not shown) in the secondary device in any suitable manner. Each of the slides 162 at its left end is provided with settable interposers 170 and 172 each of which is individually movable between an inactive upper position and an active lower position. When in their lower positions the interposers 170, 172 are in the path of movement of cross bars 174, 176, respectively. The cross bar 174 at opposite ends is carried by a pair of arms 178 fixed on a shaft 180 while the cross bar 176 is carried by arms 182 on a shaft 184 for purposes which will presently appear.

Figure 10:
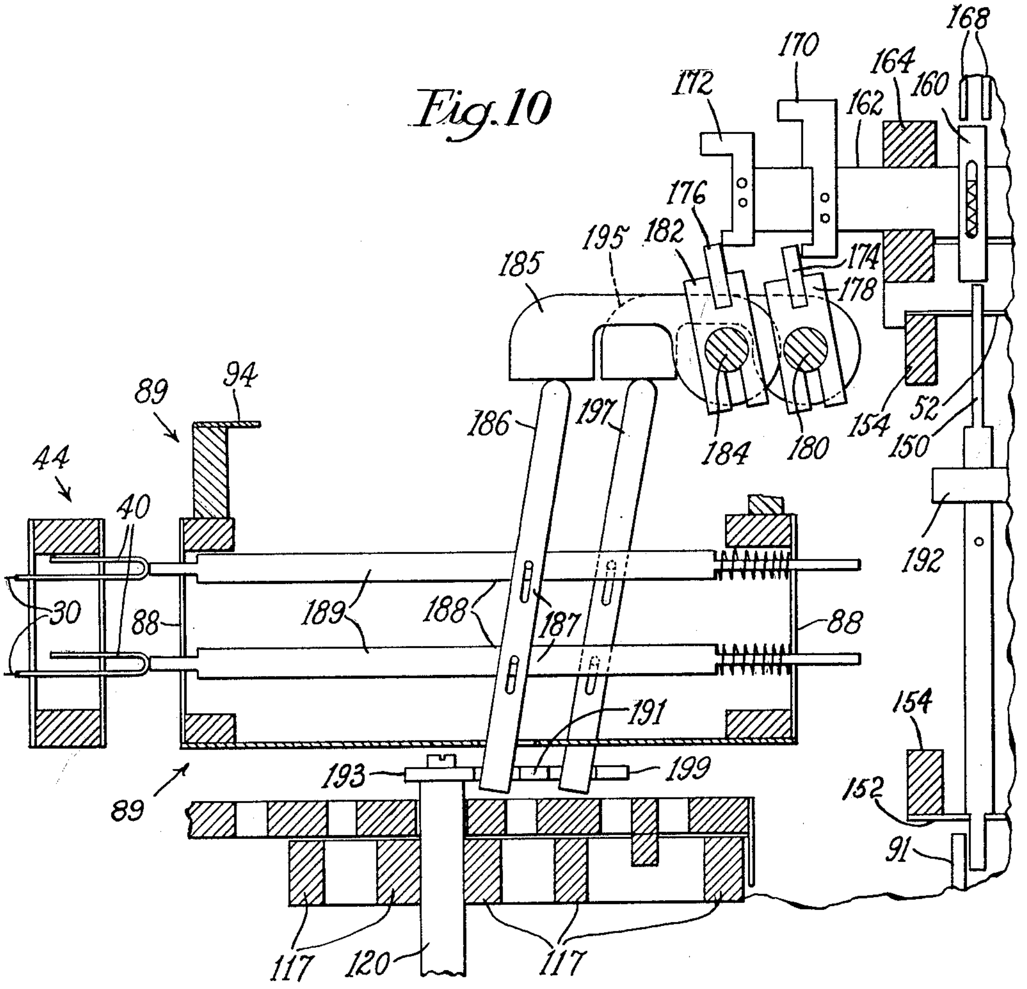
FIG. 10 is a sectional side elevation of a portion of the control mechanism.
Figure 11:
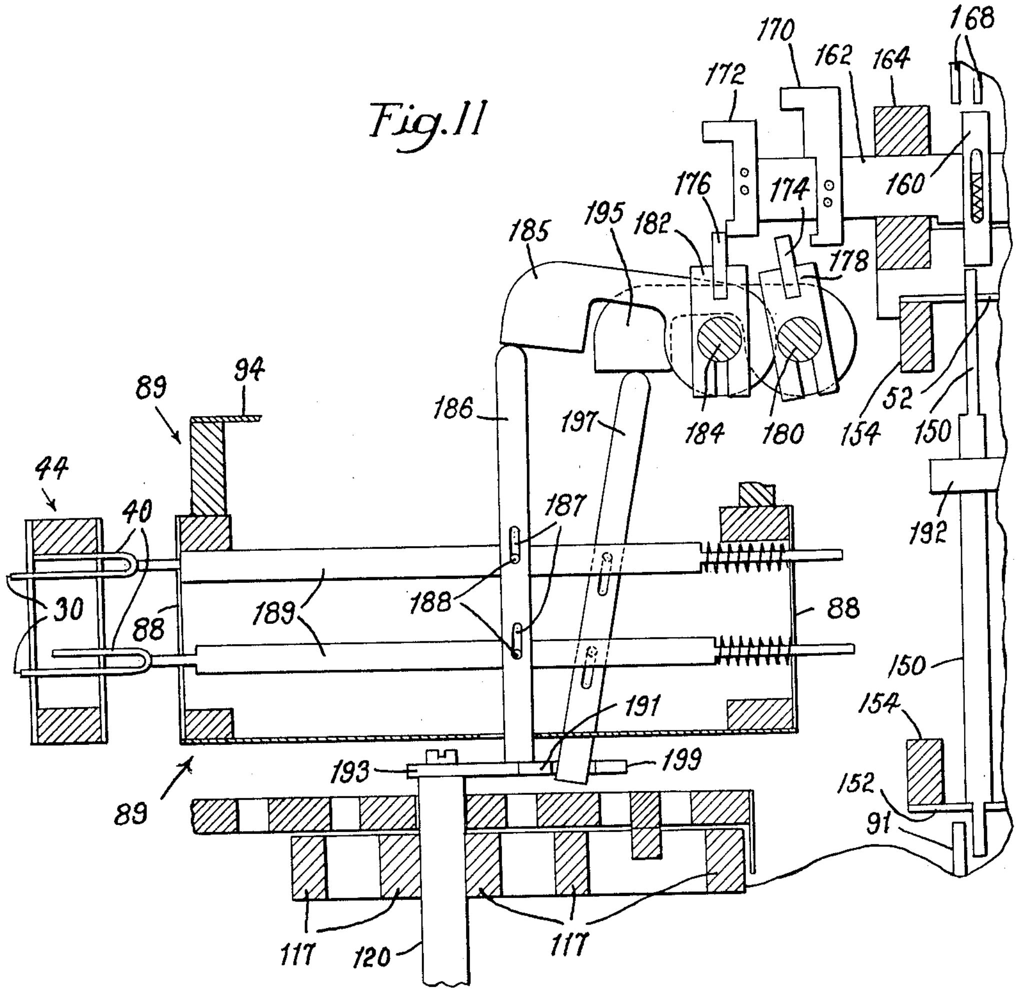
FIG. 11 is a view similar to FIG. 10 with the parts in different positions.

At one end the shaft 184 has fixed thereto an arm 185 engaging the upper end of an interposer 186 mounted for heightwise movements in the plate 94 of the frame 89 which also supports the latches 92, 93. The interposer is slotted at 187 to receive extrusions 188 in two spring pressed pins 189 slidably mounted in the vertical plates 88 in a fashion similar to the mounting of the sensing pins 86. The two pins 189 have associated therewith sensing wires 30 which are adapted to sense a control column of the record tag reserved for identifying the tag as containing master or detail information. FIG. 10 illustrates the position of the various parts when the sensing wires determine that no holes are present in the control column. When the parts are in these positions the lower end of the interposer 186 is disposed out of the path of movement of a lug 191 extending from a plate 193 secured to the link 120 of the vertically reciprocating frame which includes the cross bars 117, Thus at the time the bars 117 are rising to release the decoding slides 109, 111, 112, the lug 191 rises freely without engaging the interposer 186. However, when a hole does exist in the control column of the tag indicative of master information, the sensing pins 189 assume the positions shown in FIG. 11. Upon sensing that the tag contains master information, it is apparent that the interposer 186 is rocked so that its lower end is placed in the path of movement of the lug 191. Thus, when the bars 117 and lug 191 are raised, the interposer 186 is also raised rocking the arm 185, shaft 184 and arms 182 and moving the cross bar 176 to the right as seen in FIG. 11. Such movement engages the bar 176 with any interposer 172 that is in its path moving the associated slides 162 to the right to aline the slides 160 with the right-hand one of the associated pair of control wires 168. In this manner the information sensed from a tag may be fed into one or the other set of control wires as controlled automatically by the tag itself. It should be apparent that any column of information sensed from the tag may be selected by the operator for such field shifting merely by manually changing the position of the individual interposers 172. In a similar manner any column may also be selected as controlled by perforations in another control column by selectively shifting the interposers 170. This set of interposers is acted upon by the cross bar 174 as controlled by an arm 195, interposer 197 and another lug 199 on the plate 193.

Referring to FIG. 9, it may be seen that each of the intermediate pins 150 is provided with an extrusion 190 adapted to engage an individual arm 192 which extends across all of the intermediate slides 150 associated with an individual column of the tag. The arm 192 is pivoted on a fulcrum 194 and extends to the right beyond the fulcrum adjacent a cross bar 196 which is carried at opposite ends on arms 198 fixed to a shaft 200. During the control cycle of the machine the shaft 200 is yieldingly rocked as will appear in a clockwise direction to the position illustrated in FIG. 9. If at this time no intermediate pin 150 has been raised, the arm 192 would have remained in a lower position illustrated in dash lines so that the right end of the arm would have blocked the movement of the cross bar 196 preventing complete rocking movement of the shaft 200. Thus, it is apparent that during the sensing and decoding of any single column of perforations on the record tag at least one of the intermediate pins 150 should be raised to operate one of the control wires 168 according to the digit sensed from the record. If such is the case, the arm 192 is rocked clockwise so that the cross bar 196 is not blocked and the shaft 200 can complete its rocking movement. At one end, the shaft 200 has fixed thereto an arm 202 (FIG. 1) which is connected by a link 204 to one arm of a cam lever 206 which is operated by a cam 208 to oscillate the bar 196. At the other end, the shaft is provided with an arm 210 connected to a rod 212 which actuates a control wire 214 for signaling the presence of an error or malfunction to the secondary device.

It should be noted that there is an individual lever 192 provided for each set of slides 150 so that the operation of each decoding mechanism is checked. From the above description it should be apparent that if the decoding mechanism for any column of the tag fails to decode the perforations, its individual associated lever 192 will block the oscillation of the bar 196 and hence also prevent operation of the control wire 214 to indicate the error. However, since some of the available columns of the tag are commonly left unperforated, it is desirable to avoid testing the output of the decoding mechanisms for those columns. To this end each of the levers 192 has associated therewith an individual latch 216 which is settable in two positions as determined by a spring detent. As shown in FIG. 9, the latch 216 is in its upper inactive position which does not interfere with the operation of its associated lever 192. However, when set in its lower position, the latch 216 depresses the lever 192 into a position where it cannot block movement of the bar 196. Since there is a latch provided for each column, the operator may prevent error checking for any selected column. However, at times it may be desirable to eliminate error checking for all columns. To this end there is provided a bar 218 which extends across all of the levers 192 and which may be moved down at the will of the operator by means of a handle 220 to depress all of the levers simultaneously.

Having thus described my invention, what I claim as new and desire to secure by Letters Patent of the United States is:

1. An apparatus for decoding records having data encoded in groups of indications of one or the other of two multi-position codes including means for sensing each group for code indications of both of said codes, a plurality of decoding mechanisms each controlled by the sensing means for an individual group and manually settable means for individually conditioning each mechanism to decode the indications sensed from the associated group according to one or the other of said codes.

2. An apparatus for decoding records having data encoded in groups of indications of one or the other of two multi-position codes, one of said codes being characterized by having an additional code position in each group, means for sensing each position for indications of both codes, a plurality of decoding mechanisms each associated with an individual group of positions and comprising a plurality of latches each actuated by the sensing means for an individual code position, a plurality of decoding slides controlled by said latches including two slides engageable by one latch associated with said additional code position, and manually settable means for conditioning said one latch for controlling said two slides differentially according to one or the other of said codes.

3. An apparatus for decoding records having data encoded in groups of indications arranged according to one or the other of two multi-position codes, one of said codes being characterized by having an additional code position in each group, means for sensing each code position for indications common to both codes and also indications in said additional positions, a plurality of decoding mechanisms each associated with an individual group of code positions and comprising a plurality of movable decoding slides controlling the selection of elements representative of the coded data including two slides associated with said additional code position, a plurality of latches controlled by the sensing means for movements into blocking engagement with associated slides according to the indications sensed, one of said latches being associated with said two slides, and manually settable means for conditioning said one latch to engage one or the other of said two slides alternately depending on the presence and absence of indications in said additional code position to select said elements according to said one code and for conditioning said one latch to engage said two slides simultaneously to prevent said two slides from controlling the selection of said elements according to said other code.

4. In apparatus for analyzing records having a plurality of columns of indications coded in one or the other of two multi-position codes, said records also having one or more control columns for identifying the significance of the coded data, a station to which individual records are fed for sensing including a first means for sensing each record column for code indications of both of said codes, a second means for sensing the indications in the control columns for identifying the significance of the coded data, a plurality of decoding mechanisms each controlled by the first sensing means for an individual column, manually settable means for individually conditioning each mechanism to decode the indications sensed from the associated column according to one or the other of said codes, members representative of the decoded value selected by the decoding mechanism for each column at least two elements actuatable alternately by each of said members, a bar movable according to the significance of the coded data as controlled by the second sensing means, and manually settable means for individually connecting to said bar the members associated with any selected individual decoding mechanism for selecting the elements to be actuated according to the significance of the data sensed.

5. In apparatus for analyzing records having a plurality of columns of coded data indications and one or more control columns for identifying the significance of the coded data, a station to which individual records are fed for sensing including a first means for sensing the columns of coded data indications, a second means for sensing the indication in the control columns for identifying the significance of the coded data, a plurality of mechanisms controlled by the first sensing means, each mechanism being associated with an individual record column for decoding the coded data and for selecting members representative of the value of said data, at least two elements actuatable alternately by each of said members, a bar movable according to the significance of the coded data as controlled by the second sensing means, and manually settable means for individually connecting to said bar the members associated with any selected individual decoding mechanism for selecting the elements to be actuated according to the significance of the data sensed.

6. In apparatus for analyzing records having a plurality of columns of coded data indications and a control column for identifying the significance of the data, a station to which individual records are fed for sensing including a first means for sensing the columns of coded data indications, a second means for sensing the indications in the control column for identifying the significance of the coded data, a plurality of mechanisms controlled by the first sensing means, each mechanism being associated with an individual column of data for decoding the data for selecting members representative of the value of the data in said column, at least two elements associated with each of said members, an intermediate pin extending between each member and its associated two elements, a plurality of movable slides each carrying the intermediate pins associated with an individual decoding mechanism, a bar extending across all of said slides, means controlled by the second sensing means for moving said bar between two positions according to the significance of the coded data, and manually settable means for individually connecting any slide to said bar for movement therewith for selecting any column of data to be processed according to the significance of the data on the record.

7. In apparatus for analyzing records having a plurality of columns of indications coded in one or the other of two multi-position codes, said records also having one or more control columns for identifying the significance of the coded data, a station to which individual records are fed for sensing including a first means for sensing each record column for code indications of both of said codes, a second means for sensing the indications in the control columns for identifying the significance of the coded data, a plurality of decoding mechanisms each controlled by the first sensing means for an individual column, manually settable means for individually conditioning each mechanism to decode the indications sensed from the associated column according to one or the other of said codes, members representative of the decoded value selected by the decoding mechanism for each column, at least two elements actuatable alternately by each of said members, a bar movable according to the significance of the coded data as controlled by the second sensing means, manually settable means for individually connecting to said bar the members associated with any selected individual decoding mechanism for selecting the elements to be actuated according to the significance of the data sensed, a plurality of levers each individually associated with the elements related to an individual decoding mechanism and movable upon selection of any one of said elements, a second bar extending across one end of all of said levers and movable yieldably between two positions, each of said levers occupying positions blocking the movement of said second bar when said lever is not actuated by one of said elements, said levers each being moved to a position out of the path of movement of said second bar when one of its associated elements has been actuated to represent the value of the coded data in an individual column in the record, and means for actuating said second bar between said two positions after said elements have been selected whereby failure of decoding mechanism to select at least one of said elements causes movement of said second bar to be blocked to indicate the malfunction.

8. An apparatus for decoding records having data encoded in columns, means for sensing all of said columns simultaneously, a plurality of decoding mechanisms each controlled by the sensing means for an individual record column for selecting one of a plurality of elements representative of the coded data in said column, a plurality of levers each individually associated with the elements related to a single record column and movable upon selection of any one of said elements, a bar extending across one end of all of said levers and movable yieldingly between two positions, each of said levers occupying positions blocking the movement of said bar when said lever is not actuated by one of said elements, said levers each being moved to a position out of the path of movement of said bar when one of its associated elements has been actuated to represent the value of the coded data in an individual column of the record, and means for actuating said bar between said two positions after said elements have been selected whereby failure of any decoding mechanism to select at least one of said elements causes movement of said bar to be blocked to indicate the malfunction.

9. An apparatus for decoding records having data encoded in columns, means for sensing all of said columns simultaneously, a plurality of decoding mechanisms each controlled by the sensing means for an individual record column for selecting one of a plurality of elements representative of the coded data in said column, a plurality of levers each individually associated with the elements related to a single record column and movable upon selection of any one of said elements, a bar extending across one end of all of said levers and movable yieldingly between two positions, each of said levers occupying positions blocking the movement of said bar when said lever is not actuated by one of said elements, said levers each being moved to a position out of the path of movement of said bar when one of its associated elements has been actuated to represent the value of the coded data in an individual column of the record, means for actuating said bar between said two positions after said elements have been selected whereby failure of any decoding mechanism to select at least one of said elements causes movement of said bar to be blocked to indicate the malfunction, and manually settable means for latching each lever individually in its non-blocking position thereby preventing detection of malfunction for any selected decoding mechanism.

10. An apparatus for decoding records having data encoded in columns, means for sensing all of said columns simultaneously, a plurality of decoding mechanisms each controlled by the sensing means for an individual record column for selecting one of a plurality of elements representative of the coded data in said column, a plurality of levers each individually associated with the elements related to a single record column and movable upon selection of any one of said elements, a bar extending across one end of all of said levers and movable yieldingly between two positions, each of said levers occupying positions blocking the movement of said bar when said lever is not actuated by one of said elements, said levers each being moved to a position out of the path of movement of said bar when one of its associated elements has been actuated to represent the value of the coded data in an individual column of the record, means for actuating said bar between said two positions after said elements have been selected whereby failure of any decoding mechanism to select at least one of said elements causes movement of said bar to be blocked to indicate the malfunction, manually settable means for latching each lever individually in its non-blocking position thereby preventing detection of malfunction for any selected decoding mechanism, and a manually settable latch engageable with all of said levers for latching said members in their non-blocking position to prevent any detection or malfunction for all decoding mechanisms.

References Cited in the file of this patent

UNITED STATES PATENTS 2,311,471 Ritzert ---------------- Feb. 16, 1943